US008117068B2

(12) United States Patent
Shuster et al.

(10) Patent No.: US 8,117,068 B2
(45) Date of Patent: Feb. 14, 2012

(54) METHOD AND APPARATUS FOR PROVIDING AUDIO ADVERTISEMENTS IN A COMPUTER NETWORK

(75) Inventors: Brian Mark Shuster, Stateline, NV (US); Steven Christopher Bugg, South Lake Tahoe, CA (US)

(73) Assignee: Hoshiko LLC, Henderson, NV (US)

( * ) Notice: Subject to any disclaimer, the term of this patent is extended or adjusted under 35 U.S.C. 154(b) by 444 days.

(21) Appl. No.: 12/464,782

(22) Filed: May 12, 2009

(65) Prior Publication Data

US 2009/0287569 A1 Nov. 19, 2009

Related U.S. Application Data

(63) Continuation of application No. 09/893,362, filed on Jun. 25, 2001, now abandoned.

(60) Provisional application No. 60/213,396, filed on Jun. 23, 2000, provisional application No. 60/213,827, filed on Jun. 23, 2000, provisional application No. 60/225,943, filed on Aug. 17, 2000, provisional application No. 60/226,108, filed on Aug. 17, 2000.

(51) Int. Cl.
*G06Q 30/00* (2006.01)
*G06F 17/00* (2006.01)
*G06F 15/16* (2006.01)

(52) U.S. Cl. ............... 705/14.53; 705/14.66; 705/14.68; 705/14.73; 700/94; 709/203

(58) Field of Classification Search ............... 705/14.53, 705/14.66, 14.68, 14.73; 700/94; 709/203
See application file for complete search history.

(56) References Cited

U.S. PATENT DOCUMENTS

| 5,737,619 | A | * | 4/1998 | Judson | 715/236 |
| 5,983,273 | A | * | 11/1999 | White et al. | 709/229 |
| 6,185,586 | B1 | * | 2/2001 | Judson | 715/207 |
| 6,636,247 | B1 | | 10/2003 | Hamzy et al. | |
| 6,738,382 | B1 | * | 5/2004 | West et al. | 370/401 |
| 7,272,631 | B2 | * | 9/2007 | Shuster | 709/203 |
| 7,475,404 | B2 | * | 1/2009 | Hamel | 719/317 |
| 2002/0022999 | A1 | | 2/2002 | Shuster et al. | |

OTHER PUBLICATIONS

Sinha, Alok, et al., "Behind the Scenes at MSN 2.0: Architecting an Internet-Based Online Service", Microsoft Systems Journal, v. 12 No. 4, Apr. 1997.*
"Net-mercial.com partners with GEO Interactive to deliver dynamic audio/video Internet advertising solutions", PR Newswire, p. 2239, Aug. 18, 1999.

* cited by examiner

*Primary Examiner* — Donald L. Champagne
(74) *Attorney, Agent, or Firm* — Knobbe Martens Olson & Bear LLP

(57) ABSTRACT

A method and apparatus for providing audio advertisements in a computer network enables Web sites to deliver audio advertisements that cannot be bypassed by a visitor. More particularly, an advertising or sponsoring Web site receives a request from at least one user for delivery of a user-selected Web page associated with the Web site. The Web site selects at least one audio advertisement from a plurality of audio advertisements for delivery to the user in conjunction with the user-selected Web page. The Web site then delivers the audio advertisement to the user via the network in a format that precludes the user from controlling the manner of playback of the audio advertisement.

12 Claims, 2 Drawing Sheets

METHOD AND APPARATUS FOR PROVIDING AUDIO ADVERTISEMENTS IN A COMPUTER NETWORK

CROSS-REFERENCE TO RELATED APPLICATIONS

This application is a continuation of application Ser. No. 09/893,362, filed Jun. 25, 2001, now abandoned, which claims priority pursuant to 35 U.S.C. §119(e) to the following related applications: (a) U.S. Provisional Application No. 60/213,396, filed Jun. 23, 2000; (b) U.S. Provisional Application No. 60/213,827, filed Jun. 23, 2000; (c) U.S. Provisional Application No. 60/225,943, filed Aug. 17, 2000; and (d) U.S. Provisional Application No. 60/226,108, filed Aug. 17, 2000. All of the foregoing applications are specifically incorporated by reference herein, in their entirety.

BACKGROUND OF THE INVENTION

1. Field of the Invention

The present invention relates to a method and apparatus for providing audio advertisements in a computer network. More specifically, this invention relates to a method and apparatus for delivering customized audio advertisements to users in a manner such that users are not required to perform any action nor are they enabled to control the audio stream provided by these audio advertisements.

2. Description of Related Art

For many years, the global retail market has been characterized as a market in which physical products are sold from physical locations. In recent years, however, this dynamic has undergone a significant change in response to the increasing popularity of the Internet and in particular with the increasing popularity of advertising on the Internet. It should be appreciated that the Internet is defined here as a collection of interconnected (public and/or private) networks linked together by a set of standard protocols (such as TCP/IP and HTTP) to form a global, distributed network. While this term is intended to refer to what is now commonly known as the Internet, it is also intended to encompass variations that may be made in the future, including changes and additions to existing standard protocols.

Many Internet websites are supported by business models that rely heavily, if not entirely, on revenue generated from the sale of advertising. A host website devoted to the presentation of news, commentary, product/service descriptions and other forms of content may further include advertisements in the form of graphic or textual banners covering a portion of the displayed page. A visitor to the website can obtain additional information regarding the product or service shown in the advertisement by clicking on a portion of the advertisement. This action generally causes a separate page to be delivered to the visitor containing the additional information. These host websites are paid by sponsors according to the number of clicks made by website visitors on these sponsored advertisements. Therefore, a decline in the number of clicks a particular sponsor advertisement receives directly translates to a loss in revenue for the host website. As the Internet becomes more popular and commercial, these websites are having an increasingly difficult time selling advertisements due to a substantial reduction in most website visitors' willingness to click on these advertisements. A primary reason for this reluctance is the simple fact that website advertisements are now so common that website visitors are no longer enticed to click on them. Thus, as website visitors become more aware of particular types of advertisements they are much more inclined to ignore them.

As the Internet becomes more popular, and as Internet users gain access to the Internet at increasing modem speeds and bandwidth levels, multimedia content on the Internet is becoming more prevalent. This development means that a wider variety of new advertising modalities are becoming available. In response to this availability, many websites are now attempting to add audio advertisements to their online advertisement repertoire; however, there are drawbacks with the way in which current audio advertisements are implemented on the Internet. One problem is that website visitors must launch an audio streaming application in order to listen to an audio program. If the visitor chooses not to launch the audio streaming application, the audio advertisement will not be performed. Even if the visitor does launch the audio streaming application, the visitor can still bypass the audio advertisement altogether by simply scrolling ahead of the advertisement using the control buttons of the audio streaming application. Thus, the visitor can effectively thwart the delivery of the audio advertisement to the detriment of the host website and the sponsor.

A need in the industry therefore exists for a way to enable websites to deliver audio advertisements that cannot be bypassed by the visitor. More specifically, the audio advertisements should not require the visitor to perform any action to enable delivery of the audio advertisement, and the visitor should not be able to otherwise control the manner of delivery of the audio advertisement.

SUMMARY OF THE INVENTION

A method and apparatus for providing audio advertisements in a computer network enables Web sites to deliver audio advertisements that cannot be bypassed by a visitor. More particularly, an advertising or sponsoring Web site receives a request from at least one user for delivery of a user-selected Web page associated with the Web site. The Web site selects at least one audio advertisement from a plurality of audio advertisements for delivery to the user in conjunction with the user-selected Web page. The Web site then delivers the audio advertisement to the user via the network in a format that precludes the user from controlling the manner of playback of the audio advertisement.

In an embodiment of the invention, the advertising or sponsoring Web site provides software code that gives users alternative methods to link to other websites during any one of these audio advertisements. In particular, the software code may include "shortcut" commands that automatically forward the user to a sponsor Web page once that shortcut command is executed. The user's input device may therefore be empowered in such a way that multiple input combinations may yield a plurality of different results.

In another embodiment of the present invention, participating Web sites may cross-promote each other within the computer network. The advertisers are compensated according to the number of audio advertisements that particular advertiser has presented to users for particular sponsors. Credits may, for example, be exchanged for audio advertisements on the Web site hosted by the sponsor corresponding to audio advertisement for which these credits were received.

In another embodiment, a database comprising the web session tendencies of all visitors to the computer network is maintained. It should be appreciated that tendency data is stored within this database in order to determine which audio advertisements are best suited for particular users. In particular, these tendencies are associated with corresponding users in order to generate query strings used to search through an advertisement database. Particular audio advertisements are then selected according to a weighting algorithm that determines which search results are more likely to yield favorable results in response to those audio advertisements selected.

A more complete understanding of a method and apparatus for providing audio advertisements in a computer network will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

The present invention is directed towards a method and apparatus for providing audio advertisements in a computer network. More specifically, the present invention is directed towards a method and apparatus for providing audio advertisements without requiring that the user take any action to initiate the audio delivery or performance. In a preferred embodiment of the invention, audio advertisements are played in a randomly accessible series such that a user is exposed to advertisements tailored to their interests. In particular, the present invention allows for audio advertisements to be played in a manner such that each subsequent advertisement is based on user reactions to prior audio advertisements. It should be appreciated that these audio advertisements may include advertisements that promote various other websites in a computer network. Moreover, a method and apparatus is described for cross-promoting participating websites in a computer network such that advertiser computer systems receive credits for playing audio advertisements for other websites directly from their own website. Within such embodiments, the advertiser responsible for playing an audio advertisement shall receive credit for playing that advertisement from the appropriate sponsor. In the detailed description that follows, it should be appreciated that like element numerals are used to describe like elements illustrated in one or more of the figures.

Figure 1:
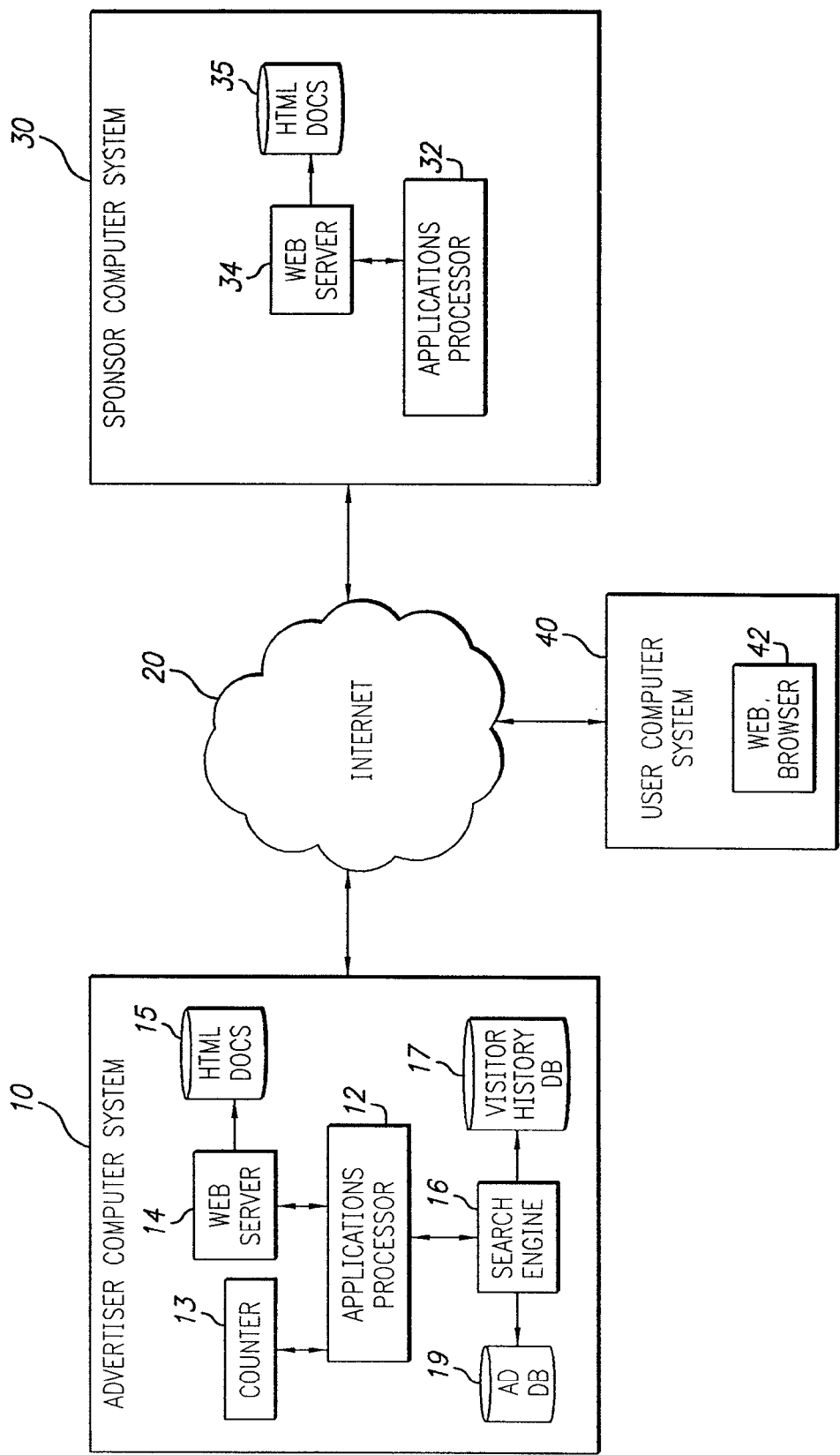
FIG. 1 is a block diagram of an apparatus for providing audio advertisements in a computer network in accordance with the invention.

Referring now to FIG. 1, a block diagram is illustrated of a wide area network employing a method and apparatus according to an embodiment of the invention. It is anticipated that the present invention operates with a plurality of computers that are coupled together within a wide area network, such as the Internet 20, or other communications network. As illustrated, an advertiser computer system 10 is shown to communicate with a sponsor computer system 30 and user computer systems 40 via the Internet 20. It should be appreciated that user computers 40 may include any type of computing device that allows a user to interactively browse websites, such as a personal computer (PC) that includes a Web browser application 42 (e.g., Microsoft Internet Explorer™ or Netscape Communicator™). Suitable user computers 40 equipped with browsers 42 are available in many configurations, including handheld devices (e.g., PalmPilot™), personal computers (PC), laptop computers, workstations, television set-top devices, multifunctional cellular phones, and so forth.

It should be further appreciated that the advertiser computer system 10 is defined here as a computer system hosting websites on which sponsors have placed an audio advertisement to promote certain products and services of the sponsor, while the sponsor computer system 30 is herein referred to as those computer systems with websites for which audio advertisements on the advertiser computer system 10 are designed to promote. The wide area network may include many such advertiser computer systems and sponsor computer systems. While a single user computer system 40 is shown in FIG. 1, it should be appreciated that many such user computer systems may be in communication with the advertiser computer system 10 and/or sponsor computer system 30 simultaneously.

The advertiser computer system 10 is comprised of an applications processor 12 coupled to a counter 13, a Web server 14 connected to an HTML (Hyper-Text Markup Language) documents database 15, and a search engine 16 connected to a visitor history database 17 and an advertisement database 19. Similarly, the sponsor computer system 30 is comprised of an applications processor 32 coupled to a Web server 34 connected to an HTML (Hyper-Text Markup Language) documents database 35. As is generally known in the art, search engines (such as search engine 16) typically incorporate a database engine, such as a SQL Server™ engine from Microsoft Corporation or Oracle™ database engine, as part of their architecture. It is also well known in the art that such search engines typically perform searches by operating on a string of characters, known as a "query string." A query string is coded according to a set of rules determined by the database engine and/or a user interface between the database engine and the user. As used herein, a "query" is broader than a "query string," denoting both the query string and the search logic represented by the query string, whereas "query string" refers only to a string of characters, symbols, or codes used to define a query. As is also generally known in the art, Web servers (such as Web servers 14 and 34) access a plurality of Web pages, distributable applications, and other electronic files containing information of various types respectively stored in HTML document databases 15 and 35. As a result, Web pages may be viewed on various user computers 40; for example, a particular Web page or other electronic file may be viewed through a suitable application program residing on a user computer 40, such as a browser 42, or by a distributable application provided to the user computer 40 by Web server 14 or 34.

It should be further appreciated that a user identifies a desired Web page for delivery to the user computer 40 by communicating an HTTP (Hyper-Text Transport Protocol) request from the browser application 42. The HTTP request includes the Uniform Resource Locator (URL) of the desired Web page, which may correspond to an HTML document stored in the HTML documents databases 15, 35. The HTTP request is routed to the Web servers 14, 34 via the Internet 20. The Web servers 14, 34 then retrieve the HTML document identified by the URL, and communicate the HTML document across the Internet 20 to the browser application 42. The HTML document may be communicated in the form of plural message packets as defined by standard protocols, such as the Transport Control Protocol/Internet Protocol (TCP/IP).

It should be noted that other architectural embodiments of the invention may also be implemented. Within one such alternative embodiment, only the sponsor computer system 30 may be comprised of the sub-components described above while the advertiser computer system 10 is comprised of only an applications processor 12 coupled to a Web server 14 connected to an HTML documents database 15. It should also be noted that, since sponsor computer systems 30 may also be comprised of audio advertisements and since some advertiser computer systems 10 may also be sponsors, a sponsor computer system 30 may simultaneously be considered an advertiser computer system 10 in some embodiments and vice versa. For simplicity, the following description is made assuming that the advertiser computer system 10 and the sponsor computer system 30 both have architectures consistent with the block diagram described in FIG. 1. If this type of architecture is implemented, it should be understood that the advertiser computer system 10 ultimately controls how these audio advertisements are presented to the user (e.g., which audio advertisements, at what frequency, etc.). It should be appreciated that the alternative architectural embodiment described above may also be implemented, where the sponsor computer system 40 ultimately controls how these audio advertisements are presented to the user, without compromising the scope and spirit of the invention.

In an embodiment of the invention, an advertiser computer system 10 delivers customized audio advertisements to a user according to tendency data stored within the visitor history database 17 for that particular user. The tendency data includes topical measurements of a users information interests. Various methods may be used to determine a user's tendencies, such as, for example, providing a form or Web page for the user to designate topical areas of interest, analyzing the user's demographic and purchasing information to ascertain likely areas of interest, and analyzing a record or history of the user's prior queries. It may be particularly useful to rank user tendencies in priority order. For example, if tendencies are to be determined from a record of prior queries, the tendencies could be ranked according to factors such as the frequency with which the same or similar queries have been repeated, the number of related queries in a topical area, and the length of time since the query was repeated. These and various other methods known in the art may be used to determine a user's tendencies, and the invention is not limited by the method that the determination is made.

Figure 2:
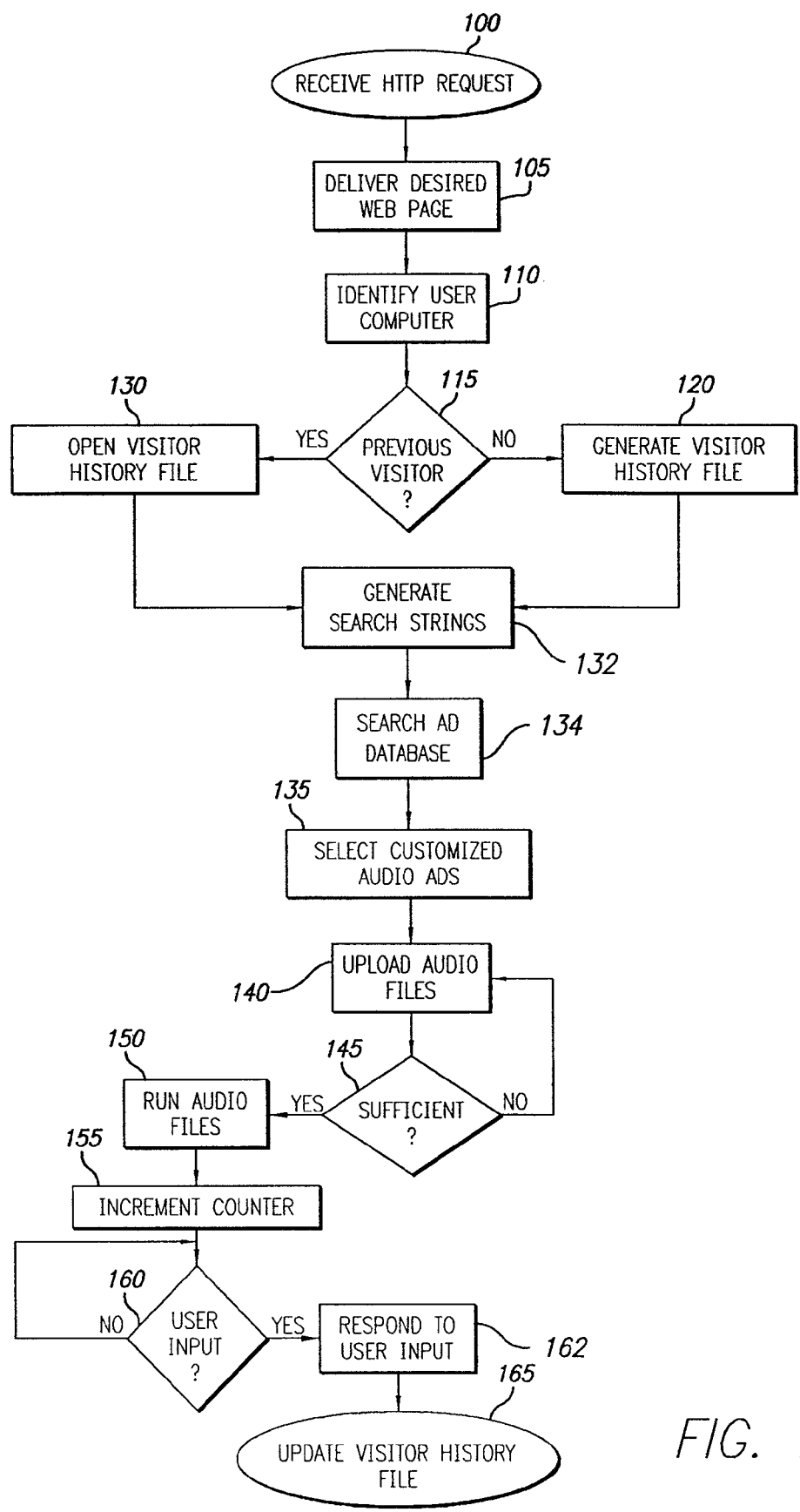
FIG. 2 is a flow chart outlining the operation of advertiser computer systems according to a preferred embodiment of the invention.

FIG. 2 illustrates a flow chart outlining the operation of advertiser computer systems 10 according to a preferred embodiment of the invention. This operation begins at step 100 when the advertiser computer system 10 receives an HTTP request from the user computer system 40. At step 105, the advertiser computer system 10 then delivers the desired Web page to the user computer system 40. The user computer system 40 is then identified by the advertiser computer system 10 at step 110 in order to determine whether this particular user has a previous history with the advertiser computer system 10 at step 115. If a previous history is indeed found at step 115, then the history file describing the tendencies of this particular user stored within the visitor history database 17 is opened at step 130; otherwise, a history file for that particular user is generated at step 120. It should be appreciated that whenever a history file is generated, the tendency information contained in this file may be based on numerous criteria. Such criteria may include the nature of the website as identified by the operator of the website, the nature of the website as determined by an analysis of the name, URL, content and keywords of the website, the nature of the website from which the user arrived at the advertiser's website, or any other type of identifying information at the disposal of the advertiser computer system 10.

In an embodiment of the invention, the above-described criteria are used to generate primary search strings at step 132. In particular, the primary search strings generated at step 132 may be simple query strings that are used to ascertain information from the visitor history database 17 using a conventional search engine 16. Such primary search strings may, for example, include "restaurants in city y", which may result from the advertiser computer system 10 having detected that the user had visited a website describing a restaurant in city y prior to visiting the advertisers website.

The procedure continues at step 134 with a search of an advertisement database 19 being performed according to the search strings found at step 132. Depending on the criteria desired by the advertiser computer system 10, an internal weighting algorithm may be used to determine which returned search results best match the tendencies of the user as anticipated by the advertiser computer system 10. The advertiser computer system 10 then selects only those search results receiving a criterion score above some predetermined threshold at step 135. It is to be understood that different audio advertisements may be selected for different users based on different criteria scores. For example, if a user links to an advertisers website pertaining to politics from a website pertaining to news, then the user may receive an audio advertisement pertaining to breaking news about politics. If a different user links to this same advertiser's website from a website pertaining to taxes, then that user might receive an audio advertisement pertaining to a political candidate who advocates a cut in taxes.

In a similar embodiment, these searches may be expanded using an internal search string database, containing sets of generic search strings that are typically associated with certain strings, simultaneously with the visitor history database 17 in order to generate secondary search strings. In particular, the applications processor 12 may be programmed to search for more specific search strings from within this search string database in an attempt to provide the user with an audio advertisement that more accurately reflects the profile of the user according to tendency data stored in the visitor history database 17. The aforementioned search for "restaurants in city y", for example, may thus include a search that is expanded to also include "hotels in city y" or "restaurants in city x", where city x may be close in proximity to city y. Within the context of the flow chart illustrated in FIG. 2, these secondary search strings may be generated at step 132 simultaneously with the previously described primary search strings. The primary and secondary search strings found at step 132 may then be combined and used to search through the advertisement database 19 at step 134 followed by the selection of the appropriate audio advertisements at step 135.

Once the appropriate audio advertisements have been selected at step 135, the advertiser computer system 10 proceeds by downloading these audio files to the user computer system 40 at step 140. It should be appreciated that the download described here for step 140 does not necessarily supersede the download of other content that the user is receiving, but rather the audio file may be downloaded concurrently with other data, or before or after any or all of the other data that is requested by the user computer system 40. In an alternative embodiment, audio files may be downloaded in conjunction with hyperlink advertisements in order to direct the user's attention to these hyperlinks for the purpose of generating traffic on the advertiser's website. In another embodiment, the loading of the audio file at step 140 is independent of the Web page from where it originated. Within this embodiment, an audio file will continue to be downloaded onto the user computer system 40 even if the user leaves the Web page before the audio advertisement has begun to play. The method of initiating this download may include the use of hidden frames, i-frames, pop-up windows, passive pop-up windows, or any other ways of creating a connection to the users Web browser 42 that would be maintained even if the user leaves the Web page that initiated the download connection.

Returning to FIG. 2, the audio file downloaded at step 140 will play on the user computer system 40 via the advertiser computer system 10 once a sufficient amount of the file is delivered. This amount is determined at step 145 according to user information ascertained at step 110, which information may include the speed of the user's modem connection and the size of the audio file being downloaded. If a sufficient amount of the file is indeed loaded at step 145, then the audio file is played at step 150; otherwise, the advertiser computer system continues to download the audio file at step 140. It should be appreciated that audio advertisements run at step 150 may be produced, compressed, and played in a variety of formats. Such formats may include flash or any other suitable format that can automatically play audio on the user computer system 40 without requiring that the user take any action to initiate the audio play. It should be further appreciated that audio advertisements are transmitted in a format such that a user computer system 40 does not launch any new application or plug-in that would allow the user to control the audio flow of the advertisement.

In an alternative embodiment, participating websites in a computer network may also cross-promote other participating websites. In particular, websites within a network may receive credits for cross-promoting other participating websites using audio advertisements. Within such an embodiment, these credits may then be exchanged for revenue, advertisement space, or any other type of compensation from the website being cross-promoted. For example, once a participating website obtains a sufficient number of credits, those credits may be exchanged for the right to run their own audio advertisement on the website being cross-promoted. It should be appreciated that any audio advertisement space not filled using these credits may be filled by audio advertisements selected by, and displayed for the benefit of, the audio advertisement network administrator (e.g., an advertisement soliciting webmasters from non-participating websites to participate in the audio advertisement network).

In general, however, the advertiser website responsible for providing a user with an audio advertisement is credited by the sponsor of that advertisement whenever a sponsor advertisement is played. In particular, the flow chart described in FIG. 2 continues at step 155 with an increment of the counter 13 which directly reflects the number of credits a particular website should receive. It is to be understood that the audio advertisement network may permit websites to present users with either a single audio advertisement per Web page, multiple audio advertisements per Web page, a single audio advertisement per time duration, or any combination of the above or similar criteria. It is to be further understood that audio advertisements may be limited in frequency such that once a user has been presented with one or several audio advertisements in a given time period, the user may not be presented with additional audio advertisements for a certain time.

Once an audio advertisement is played for a user, the user can either ignore the advertisement or act on the advertisement at step 160. Such responses to an advertisement may include visiting the sponsor's website, actively interacting with the sponsor's website, or even purchasing or otherwise completing the sponsor's desired objective on the sponsors website. In another embodiment, audio advertisements are run in conjunction with certain software applications that allow for the user to access one or more sponsor Web pages with a single key stroke, mouse click, voice command or other input. In one such embodiment, an advertiser computer system 10 may include certain software code within their website, such that when an audio advertisement is being played, the user's browser 42 will interpret certain inputs from the user's keyboard at step 160 as a "shortcut" command to forward the user to the appropriate sponsors website. It is to be understood that any appropriate input device may be similarly used, such as specific mouse buttons, specific mouse movements, specific voice commands or other appropriate input devices, or any combination of the above. It is to be further understood that advertisers may provide the aforementioned software code directly within their Web page, or the sponsor may cause such code to be embedded within the Web page, or any combination of the above, or any other way of establishing the appropriate browser response to the appropriate input may be used.

In another embodiment, the user may be introduced to several sponsors in a single audio advertisement or a combination of multiple successive audio advertisements. Within such embodiments, the user's input device may be empowered by the previously mentioned software code in such a way that multiple input combinations may yield a plurality of different results. An embodiment of the invention may, for example, dictate that the actuation of a certain key on the keyboard will cause the user's browser 42 to display another sponsor Web page. Certain keys or keystrokes could similarly cause the users browser 42 to display multiple or all sponsors in one or more browser windows. It should be understood, however, that the keyboard is described in this embodiment for explanatory purposes only, and that any appropriate input device may be similarly used.

It should be further understood that the input used by the user to display one or more sponsor websites can either be preset by the advertiser or can be dynamically sent to the advertiser from the sponsor once the appropriate audio advertisement is selected. Some embodiments may be implemented in a manner such that the input device or devices are enabled only for a certain period of time (e.g., the duration of the audio advertisement or any other pre-determined span of time). In another embodiment, keystroke inputs would serve as shortcuts to particular sponsor websites only if the user's browser 42 does not have input fields that are active in a manner such that the user would otherwise provide input to those fields. Activation of these dormant input fields, such as by a mouse click, would thereby disable any keystroke shortcut to the sponsor website until no such input fields remained active. Once all these input fields are inactive, the keystroke shortcuts may again be enabled.

Other embodiments of the present invention may also be implemented so that certain user inputs that result in a shortcut to a sponsor's website are encoded with a tracking code such that when the user arrives at the sponsor's website, they arrive by way of an encoded URL containing full tracking code data pertaining to the user's present web session which may include the use of "cookies". This tracking code may then be read by the sponsor computer system 30, once a user links to their website, in order to give appropriate credit to the advertiser from where the user was linked. Within such an embodiment, different tracking codes may be issued to different advertisers, or to different websites operated by the same advertiser. It should be noted, however, that although current tracking codes may readily identify both the advertiser computer system 10 from where the user was linked and the particular audio advertisement that was played, future tracking codes may be encoded to include a greater amount of information that further identifies the tendencies of that particular user.

It should also be noted that user inputs may include inputs of varying degrees of complexity. For example, a sponsor or advertiser may establish that the actuation of any single keystroke by the user would forward the user to the sponsor's website, or it may be established that different single or multiple keystrokes forward the user to different Web pages either within the sponsors website or some other participating website.

Returning to the flow chart illustrated in FIG. 2, the procedure continues at step 160 with the advertiser computer system 10 detecting how the user responds to the audio advertisement being played. In particular, if the advertiser computer system 10 does indeed detect an input from the user at step 160, then the appropriate response to this input is executed at step 162 followed by an update to that particular user's file within the visitor history database 17 at step 165. Otherwise, the advertiser computer system 10 remains at step 160 and continues to sense whether the user has entered an input.

In another embodiment, a sponsor may desire that the user visit the sponsor's website or a portion of the advertisers website that is displayed to the user for the benefit of the sponsor. If the user responds favorably to a particular audio advertisement within this embodiment, a new audio advertisement may then be presented. This audio advertisement may include the same, additional, or new material that is customized for users according to how they reacted to the previous audio advertisement. For example, if a visitor to a political website is presented with an audio advertisement pertaining to a politician who supports a tax cut, and that user responds by visiting that politician's website, then the audio advertisement that the user is presented with might include an advertisement in which the politician elaborates on the details of his/her tax cut proposal. This audio advertisement may further suggest additional actions on the part of the visitor, such as requesting that the user visit another Web page within the website, or the purchase of a product or service, or some other action. Continuing with the present example, this second audio advertisement may conclude with an appeal to the user to subscribe to the politician's e-mail list to receive updates on his/her campaign. Similarly, the advertisement may simply conclude with an appeal to support the candidate and to vote on election day.

It should be appreciated that, in some embodiments, an unfavorable user response to an audio advertisement does not necessarily mean that similar audio advertisements will not be presented to that particular user. Referring to the prior example, if a user is presented with a first audio advertisement for a politician advocating lower taxes, to which the user does not respond, a second audio advertisement may then be presented for the same politician pertaining to that politician's views on education and suggesting that the user review his/her website for more details. The choice of the second and all future audio advertisements may be based on any of the criteria used in selecting the first advertisement, as well as additional criteria that may have been added to visitor history database 17 since the selection of the first advertisement. It should be appreciated that a limit may also be implemented, such that if the user does not respond to a pre-determined number of audio advertisements, then the user might be subjected to a new advertising campaign.

Similarly, if the user responds positively to any audio advertisement, but does not fully complete the sponsor's desired objectives, there may be a different selection of audio advertisements presented to the user upon future visits to the advertisers website. For example, if a user favorably responds to a sponsors advertisement on an advertisers website by linking to the sponsors website, but does not join the politician's mailing list, subsequent audio advertisements may include a message reminding the user to assist in the election of the politician by adding themselves to the politician's mailing list. Similarly, if such subsequent audio advertisements are successful in fulfilling the sponsor's desired objective, the user may then be presented with a different set of audio advertisements including a "welcome back" message whenever the user returns to the sponsor's website.

It should again be noted that the "tree" of audio advertisements from which advertisements are presented may be based on a variety of factors as described above, including the degree of successful interaction that each individual user exhibits to each successive audio advertisement presented by an advertiser, and the depth of the user's exposure to the audio advertisement tree. It should therefore be appreciated that a user who visits many advertiser websites as well as many other sponsor websites directly from those advertisement websites, but who rarely or never completes the sponsors ultimate objective (e.g., subscribing to the politician's mailing list in the example above), could continuously be presented with audio advertisements that are different from other users whose behavior is different.

Having thus described a preferred embodiment of a method and apparatus for providing audio advertisements in a computer network, it should be apparent to those skilled in the art that certain advantages of the within system have been achieved. It should also be appreciated that various modifications, adaptations, and alternative embodiments thereof may be made within the scope and spirit of the present invention. The invention is further defined by the following claims.

What is claimed is:

1. A computing system comprising:
one or more hardware processors configured to execute instructions;
a computer memory holding instructions configured for execution by the one or more hardware processors in order to cause the computing system to:
receive a request for a web page from a client computing device executing a client web browser; and
send, in addition to the web page, code configured to cause the client web browser to generate a hidden frame that includes at least one audio file or a link to the at least one audio file in response to the request, wherein the hidden frame is configured to maintain a connection between the computing system and the client web browser at least until the at least one audio file is downloaded to the client computing device regardless of whether or not the web page is open on the client web browser, wherein the at least one audio file is selected based on one or more topical interests of a user of the client computing device.

2. The computing system of claim 1, the computer memory holding further instructions to cause the computing system to select the at least one audio file from a plurality of audio files for delivery to the client computing device in response to the request.

3. The computing system of claim 1, the computer memory holding further instructions to cause the computing system to deliver software code to the client computing device to enable the client computing device to request further web content while the at least one audio file is playing on the client computing device.

4. The computing system of claim 1, the computer memory holding further instructions to cause the computing system to deliver software code to the client computing device to enable the client computing device to request further web content while the at least one audio file is playing on the client computing device, the software code responsive to shortcut commands to automatically retrieve a predetermined web page.

5. The computing system of claim 1, further comprising a database operatively associated with the computing system, the database holding topical measurements of information interests for individuals.

6. A method comprising:
   receiving, by a computing system, a request for a web page from a client computing device executing a client web browser; and
   sending, by the computing system to the client computing device, code usable by the client web browser in order to generate a hidden frame including at least one audio file or a link to the at least one audio file in response to the request, wherein the hidden frame is configured to maintain a connection between the computing system and the client computing device at least until the at least one audio file is downloaded to the client computing device regardless of whether or not the web page is open on the client web browser, wherein the at least one audio file is selected based on one or more topical interests of a user of the client computing device.

7. The method of claim 6, further comprising sending the web page to the client computing device with the hidden frame.

8. The method of claim 6, further comprising selecting the at least one audio file from a plurality of audio files for delivery to the client computing device in response to the request for the web page.

9. The method of claim 8, further comprising delivering software code to the client computing device to enable the client computing device to request further web content while the at least one audio file is playing on the client computing device.

10. The method of claim 8, further comprising delivering software code to the client computing device to enable the client computing device to request further web content while the at least one audio file is playing on the client computing device, the software code responsive to shortcut commands to automatically retrieve a predetermined web page.

11. The method of claim 8, further comprising storing topical measurements of information interests for individuals in a database operatively associated with the computing system.

12. A tangible computer readable medium having software modules including executable instructions stored thereon, wherein the software modules are configured for execution by a computing system having one or more hardware processors, the software modules including at least:
   a first module configured to cause the computing system to receive a request for a web page from a client computing device; and
   a second module configured to transmit to the client computing device the requested web page and code usable by the client computing device to generate a hidden frame including at least one audio file or a link to the at least one audio file, wherein the hidden frame is configured to cause the at least one audio file to be played on the client computing device regardless of whether the web page is open on the client computing device, wherein the at least one audio file is selected based on one or more topical interests of a user of the client computing device.

* * * * *